United States Patent [19]

Schuwerk

[11] Patent Number: 4,458,517

[45] Date of Patent: Jul. 10, 1984

[54] CONTROLLED DEFLECTION ROLL

[75] Inventor: Wolfgang Schuwerk, Kisslegg, Fed. Rep. of Germany

[73] Assignee: Escher Wyss Aktiengesellschaft, Zürich, Switzerland

[21] Appl. No.: 334,643

[22] Filed: Dec. 28, 1981

[30] Foreign Application Priority Data

Jan. 15, 1981 [DE] Fed. Rep. of Germany ....... 3101116

[51] Int. Cl.³ ............................................. B21B 31/32
[52] U.S. Cl. ...................................... 72/243; 72/245; 29/116 AD
[58] Field of Search ................... 72/241, 243, 245, 16; 29/116 AD, 113 AD

[56] References Cited

U.S. PATENT DOCUMENTS

| | | | |
|---|---|---|---|
| 4,106,405 | 8/1978 | Biondem et al. | 72/243 |
| 4,262,400 | 4/1981 | Miesch | 29/116 AD |
| 4,319,522 | 3/1982 | Marchioro | 72/245 |
| 4,357,743 | 11/1982 | Hefter et al. | 29/113 AD |

Primary Examiner—Lowell A. Larson
Assistant Examiner—Jorji M. Griffin
Attorney, Agent, or Firm—Werner W. Kleeman

[57] ABSTRACT

A controlled deflection roll contains support elements or groups of such support elements which support the roll shell in relation to the roll support with forces which differ with respect to one another in accordance with a predetermined function, notwithstanding the fact that the support elements are acted upon by the same control signal from a common control source. When using hydraulic support elements this can be realized by throttle elements or throttle means located in the infeed line to one of the support elements which, if desired, also can possess a cross-sectional area which differs from the cross-sectional area of the simultaneously controlled support elements.

4 Claims, 3 Drawing Figures

CONTROLLED DEFLECTION ROLL

CROSS REFERENCE TO RELATED APPLICATIONS

This application is related to my commonly assigned, copending U.S. application Ser. No. 334,644, filed Dec. 28, 1981, entitled "Controlled Deflection Roll with Control Arrangement", and the commonly assigned, copending U.S. application of Ignazio Marchioro, Ser. No. 334,642, filed Dec. 28, 1981, entitled "Apparatus for Controlling the Pressing Force Between a Controlled Deflection Roll and a Counter Element".

BACKGROUND OF THE INVENTION

The present invention relates to a new and improved construction of a controlled deflection roll, also referred to in the art as a roll with bending or sag compensation.

Generally speaking, the controlled deflection roll of the present development is of the type comprising a roll shell which is supported upon a roll support by pressure-controllable hydraulic support elements at one or a number of effective directional planes. The hydraulic support elements are distributively arranged in the direction of the lengthwise axis of the controlled deflection roll. At least two of these support elements exert different supporting forces upon the roll shell in accordance with the predetermined function, these supporting forces being controlled through the use of the same pressure.

Such type of controlled deflection roll is known to the art from German Patent Publication No. 2,325,721. With the heretofore known roll the function between the supporting forces of two support elements impinged with the same pressure is simply a proportional function, since the effective or operative surfaces, namely the piston surfaces of the hydrostaticly structured support elements possess unequal surface areas. The effect of this corresponds approximately to doubling the surface area of two individual support elements which are constructionally grouped together, and it is much less a question of the operation of the system than a question of the fabrication costs, possibly also the strength of the components as to whether there is preferred the one or the other system design. However, there is not contemplated any simplification of the control.

As soon as other relationships are desired between the forces which are to be applied by the support elements, then previously there was varied the pressure of the hydraulic fluid medium which was infed in each case to such support elements. For each separate controllable support element there was heretofore required a separate control unit, typically composed of a valve, which reduced the infeed pressure in accordance with an electrical control signal, and a signal processing circuit which was arranged forwardly of the valve.

It is self-evident that the usually desired constancy of the line force which is to be produced at a roll nip must be accomplished that much more exactly the more that the individual support elements are individually controlled. An increase in the number of the controls is however associated with both problems in space and costs. According to German Patent Publication No. 2,847,029 it is possible to provide a compromise solution in that groups of support elements are combined into zones, which in each case only have operatively correlated thereto one control unit.

The behaviour of such zone-controlled roll has been theoretically examined and discussed in the publication "Das Papier", Volume 4, page 125 et seq., 1980, and specifically for a three-zone roll which however is not used in actual practice. The author of the aforementioned article has explained the causes for the deviations arising in practice of the roll nip width from a predetermined mean or average value; the roll profile retains its configuration also in the presence of a deviating adjustment of the mean line force, whereas however the size of the deviations vary. The aforementioned profile configuration therefore possesses in characteristic fashion "null crossovers" of the nip width deviation, so that the profile assumes the known M-shape or W-shape, wherein there are present four null crossovers or throughpasses.

SUMMARY OF THE INVENTION

Therefore, with the foregoing in mind and as an extension of the aforementioned publication it is a primary object of the present invention to simplify and render less expensive the control of the support elements by reducing the control units in that a greater number of the support elements can be controlled with the same control signal, even though the support elements must exert in each case unequal support forces over the range of the line forces which are to be generated.

Now in order to implement these and still further objects of the invention, which will become more readily apparent as the description proceeds, the controlled deflection roll of the present development is manifested by the features that the aforementioned function is predetermined by the characteristic line or characteristic of uncontrolled throttle elements arranged in the fluid medium line of at least one of the support elements.

The function between the support or supporting forces of two or more support elements throughout the range of the line forces which are to be adjusted can be determined theoretically or empirically. By utilising a sensible combination of the construction of the throttle elements, possibly with the use of support elements possessing different effective cross-sectional areas, it is possible to simulate the desired functions, as will be explained more fully hereinafter, and specifically without the necessity of structuring the mentioned throttle elements so as to be controllable themselves.

Throttle elements constitute simple components whose performance can be readily calculated and which can be accommodated into the system with modest space requirements, so that the strived for simplification at the control side of the system is not carried out at the expense of a correspondingly greater expenditure at the hydraulic side of the system.

As will be still demonstrated hereinafter notwithstanding the appreciably reduced expenditure in the control equipment it is possible to maintain extremely small the deviations in the profile or sectional shape of a rolled product from a mean or average value.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
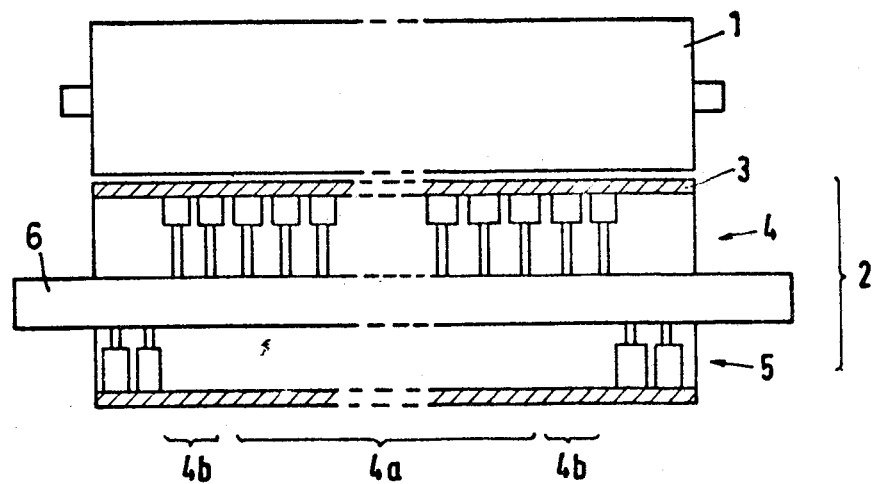
FIG. 1 schematically illustrates a controlled deflection roll which in conjunction with a coacting counter roll delimits a roll nip.

Describing now the drawings, it is to be specifically understood that only enough of the construction of the controlled deflection roll has been illustrated in the drawings to simplify the showing thereof and as needed for those skilled in the art to readily understand the underlying principles and concepts of the present development. Turning attention now specifically to FIG. 1 there is schematically illustrated therein a controlled deflection roll 2 which coacts with a cylindrical counter roll 1. This controlled deflection roll 2 contains a roll shell 3 which is guided in any suitable guide arrangement as is well known in this technology, for instance from U.S. Pat. No. 3,885,283, granted May 27, 1975. The roll shell 3 is supported upon a stationary roll support or beam 6 by means of hydrostatic support elements 4 and counter support elements 5. The support elements 4 are divided into three groups, also referred to as "zones", namely a central zone 4a and two intermediate zones 4b to the right and left of the central zone 4a. The counter support elements 5 define the marginal or end zones.

In accordance with the heretofore know state-of-the-art the central zone, both of the intermediate zones and also both of the marginal or end zones each had operatively correlated thereto a respective control arrangement, in other words there were provided a total of five control arrangements. However, in accordance with the teachings of the invention it is contemplated that in each case the marginal or end zones and the intermediate zones have inputted thereto a common control signal, here in the form of an adjustable hydraulic pressure. The different forces prevailing at the marginal and intermediate zones can be realised in that through the use of throttle arrangements there is obtained a constant pressure differential or, better still, there is maintained a force differential which decreases with the increasing set or adjusted pressure. The Table given hereinafter lists the mathematically computed pressures for line pressing forces of 40 to 120 N/mm at the roll nip or gap between the roll shell 3 and the counter roll 1 in order to obtain extremely small gap or nip width deviations, while presupposing the same effective cross-sectional areas for the support elements. The values listed at the line designated "pressure differential" can be realised, according to a first approximation, by a constant pressure differential of 6.53 bar, and according to a more exact approximation by differential values which linearly decrease with increasing pressure. The numerical values of the pressure can be ascertained from the following Table.

| Pressing Force | (N/mm) | 40 | 60 | 80 | 100 | 120 |
|---|---|---|---|---|---|---|
| $P_{end\ zone}$ (counter support source) ($F_5$) | (bar) | 3.33 | 20.03 | 36.77 | 53.53 | 70.16 |
| $P_{intermediate\ zone}$ ($F_{4b}$) | (bar) | 11.84 | 27.54 | 43.30 | 59.09 | 74.69 |
| $P_{differential}$ | (bar) | 8.51 | 7.51 | 6.53 | 5.56 | 4.53 |
| mean nip width deviations | (μm) | 0.03 | 0.11 | 0.19 | 0.27 | 0.53 |
| maximum nip width deviations | (μm) | 0.18 | 0.66 | 1.12 | 1.57 | 2.07 |

(Pressure = Force with same effective cross-sectional area)

The realisation of the requisite differential force in a common controlled zone can be obtained in that in the case of hydrostatic support elements their diameter is designed to be different and additional throttle locations can be provided at the support elements having the larger or smaller diameter, as the case may be.

Figure 2:
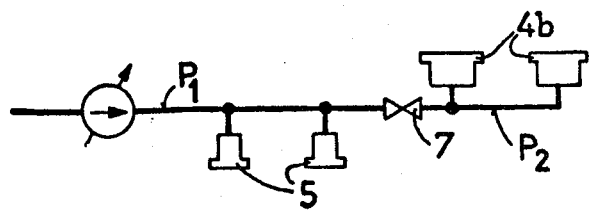
FIG. 2 schematically illustrates the construction of the hydraulic system at the marginal or end region of the controlled deflection roll shown in FIG. 1.

FIG. 2 schematically illustrates the case corresponding to the aforementioned Table. The pump furnishing the controlled pressure $P_1$ directly feeds the support elements 5 located in the marginal zone. By means of a throttle element 7 the support elements 4b of the intermediate zone are fed at a lower pressure $P_2$. Here the support elements 4b of the intermediate zone have a larger cross-sectional area than that of the support elements 5.

The throttle characteristic as a function of the controlled pressure and which is to be used for the arrangement depicted in FIG. 2 can be graphically determined. For this purpose there is used the nomogram of FIG. 3.

Figure 3:
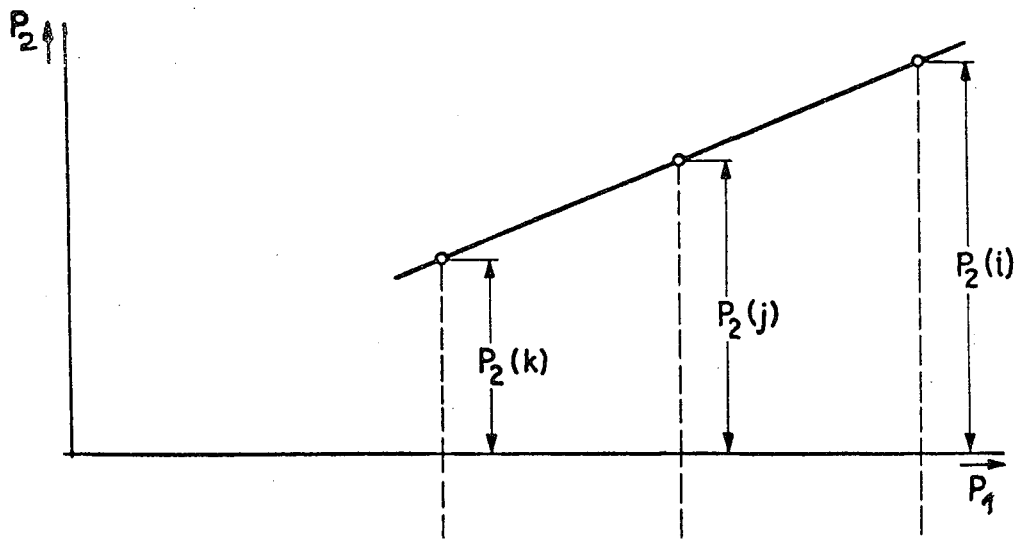
FIG. 3 is a nomogram from which there can be ascertained the course or characteristic of the support forces as a function of the impinging pressures.
Figure 3:
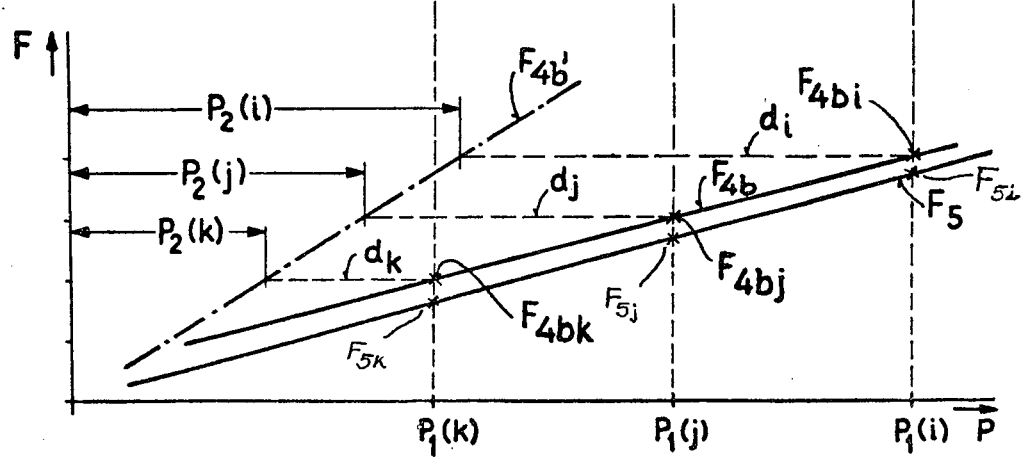

The lower coordinate system of FIG. 3 illustrates the desired course of the forces of the support elements 4b and 5 of the intermediate zone and marginal zone, respectively, as a function of a common feed or supply pressure $P_1$ according to the Table (lines $F_{4b}$ and $F_5$). The support elements 5 are directly impinged by this feed pressure $P_1$. For the three plotted load situations k, j, i there result the respective forces $F_{5k}$, $F_{5j}$, $F_{5i}$ along the line $F_5$. At the line $F_{4b}$ these three load cases correspond to the larger forces $F_{4bk}$, $F_{4bj}$ and $F_{4bi}$.

These larger forces are obtained according to the invention in that the support elements 4b of the intermediate zone possess a larger effective cross-sectional area than that of the support elements 5 of the marginal zone, and at the same time due to the action of the throttle 7 the pressure $P_1$ is reduced to the value $P_2$ in the graph of FIG. 3. In this FIG. 3 the auxiliary line $F_{4bi}$ depicts the force characteristic or course of such support elements 5 of the marginal zone as a function of the pressure impinging thereat. The horizontal distances $d_k$, $d_j$, $d_i$ correspond to the requisite pressure drop at the throttle 7 in order to obtain the forces $F_{4bk}$, $F_{4bj}$, $F_{4bi}$.

In the present embodiment there have been fixed the data given at the top of the Table; it will be recognised that other desired characteristics or courses can be similarly simply realised.

It is also conceivable that the forces effective at the intermediate zone must be smaller than the forces of the counter support sources or elements. In such case it is advantageous if the support elements which are arranged after the throttle element possess the same or a smaller effective cross-sectional area than the support elements which are directly impinged with the same pressure forwardly of the throttle element.

Although the invention has been described based upon an illustrative example of support elements and counter support elements, it should be understood that there also can be connected in the same manner the support elements or groups of support elements, as the case may be, at other locations of the controlled deflection roll.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. In a controlled deflection roll containing a roll shell which is supported upon a roll support by pressure-controllable hydraulic support elements at one or a number of effective directional planes, the hydraulic support elements being distributively arranged in the direction of the lengthwise axis of the roll, a common pressure inputted to at least two of said support elements for controlling said at least two support elements, and said at least two support elements controlled by said common pressure exerting different supporting forces upon the roll shell in accordance with a predetermined function, the improvement which comprises:

uncontrolled throttle means arranged in a fluid medium infeed line of at least one of the support elements for predetermining the function in accordance with the characteristic of said uncontrolled throttle means;

said fluid medium infeed line in which said uncontrolled throttle means is arranged interconnecting said at least two support elements; and the at least one support element in whose fluid medium infeed line there is arranged said uncontrolled throttle means prossesses an effective cross-sectional area which deviates from the effective cross-sectional area of the other support element of said at least two support elements and to which other support element there is directly inputted the common pressure and which other support element is devoid of any uncontrolled throttle means.

2. The controlled deflection roll as defined in claim 1, wherein:

the effective cross-sectional area of the at least one support element having the uncontrolled throttle means in its infeed line is larger than the effective cross-sectional area of the other support element of said at least two support elements and to which other support element there is directly inputted the common pressure and which other support element is devoid of said uncontrolled throttle means.

3. The controlled deflection roll as defined in claim 1, wherein:

the effective cross-sectional area of the at least one support element having the uncontrolled throttle means in its infeed line is smaller than the effective cross-sectional area of the other support element of said at least two support elements and to which other support element there is directly inputted the common pressure and which other support element is devoid of said uncontrolled throttle means.

4. In a controlled deflection roll containing a roll shell which is supported upon a roll support by pressure-controllable hydraulic support elements at one or a number of effective directional planes, the hydraulic support elements being distributively arranged in the direction of the lengthwise axis of the roll, a common pressure inputted to at least two of said support elements for controlling said at least two support elements, and said at least two support elements controlled by said common pressure exerting different supporting forces upon the roll shell in accordance with a predetermined function, the improvement which comprises:

uncontrolled throttle means arranged in a fluid medium infeed line of at least one of the support elements for predetermining the function in accordance with the characteristic of said uncontrolled throttle means;

said fluid medium infeed line in which said uncontrolled throttle means is arranged interconnecting said at least two support elements; and the at least one support element in whose fluid medium infeed line there is arranged said uncontrolled throttle means prossesses an effective cross-sectional area which is essentially equal to the effective cross-sectional area of the other support element of said at least two support elements and to which other support element there is directly inputted the common pressure and which other support element is devoid of said uncontrolled throttle means.

* * * * *